UNITED STATES PATENT OFFICE.

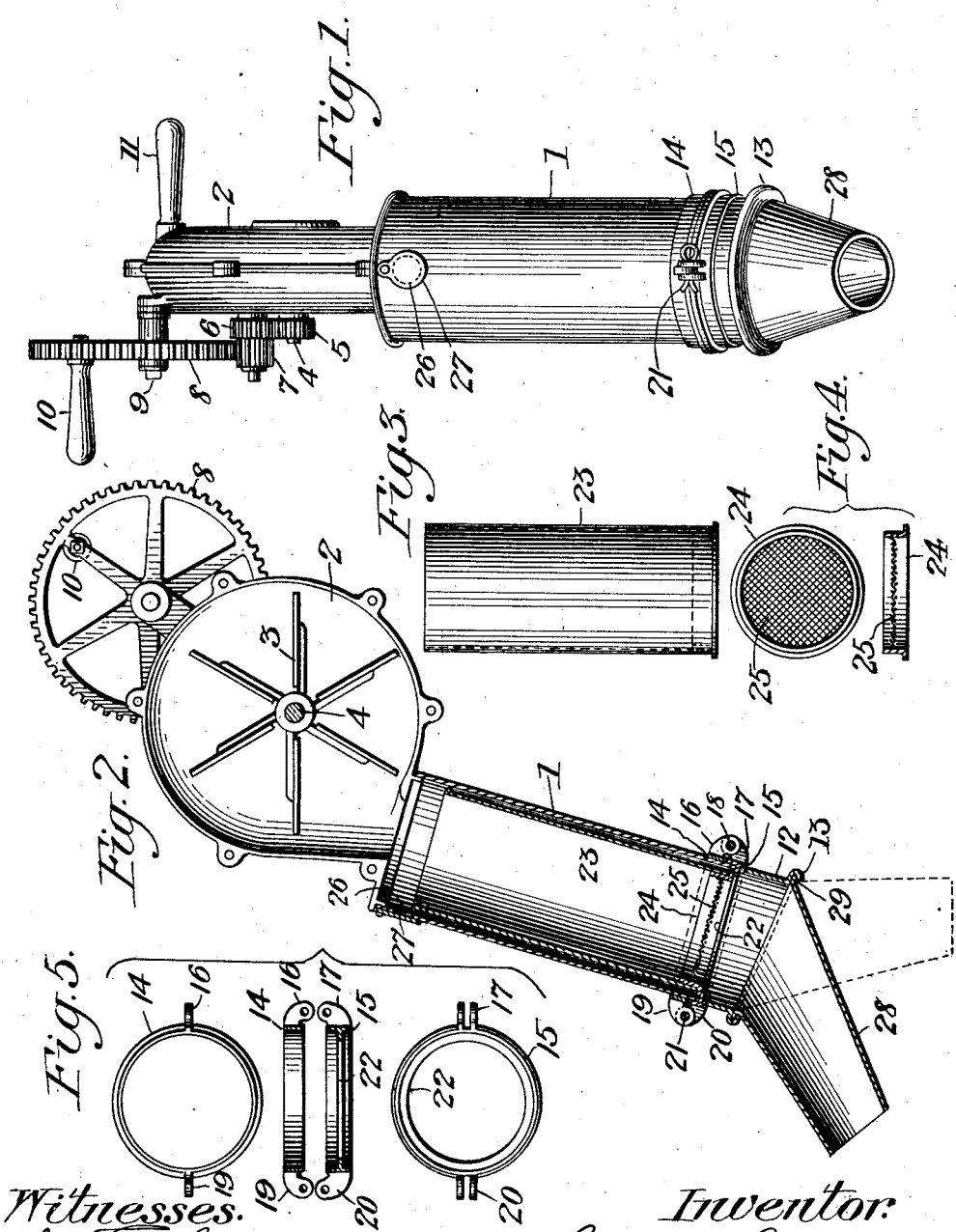

JAMES M. BOURN, OF MOSCOW, IDAHO.

SQUIRREL-EXTERMINATOR.

997,266. Specification of Letters Patent. Patented July 11, 1911.

Application filed February 23, 1910. Serial No. 545,426.

*To all whom it may concern:*

Be it known that I, JAMES M. BOURN, a citizen of the United States, residing at Moscow, in the county of Latah and State of Idaho, have invented a certain new and useful Improvement in Squirrel-Exterminators, of which the following is a full, clear, and exact description.

This invention relates to those devices used to destroy squirrels and other burrowing animals in their burrows, by injecting dense or other suffocating smoke into such holes, the devices combining smoke-producing and injecting means.

The invention consists in a new form of smoke-producer and its barrel, and in an improvement in the injector nozzle, all as I will proceed now more particularly to set forth and claim.

In the accompanying drawings, illustrating the invention, in the several figures of which like parts are similarly designated, Figure 1 is a front elevation and Fig. 2 is a longitudinal section of the complete apparatus. Fig. 3 shows in elevation the smoke-producing cartridge detached. Fig. 4 shows in top plan view and cross-section, the screen bottom of the cartridge shell. Fig. 5 is a collection of detail views showing the hinge-members connecting the movable part of the barrel with its body.

The apparatus comprises a barrel 1, which may be made of sheet-metal, open at both ends, and having a fan-case or blower-case 2 mounted upon its upper end. This fan-case or blower-case contains a rotary fan 3, mounted upon a shaft 4 borne in the case; and on this shaft is a pinion 5 connected by gears 6 and 7, mounted upon the case, with a driving gear 8 on a stud-shaft 9 on the case, and this gear 8 has a crank or handle 10 for turning it and thence through the train of gears rotating the fan. A handle or grip 11 is also applied to the case to aid the user in handling and operating the apparatus.

For convenience, the blower mechanism hereinabove described or any equivalent thereof, is hereinafter referred to as the "blower"; and while a blower is essential to the successful and convenient operation of the device of this invention, it is to be understood that the invention is not limited to any particular kind or construction of blower.

The lower part of the barrel is divided transversely and the end 12 has its outer end arranged obliquely, or on a bevel, and is provided with a flange 13. This end is hinged to the body of the barrel in any suitable way, as by means of collars 14 and 15 brazed, riveted or otherwise fixed respectively to the body of the barrel and its end. These collars have hinge-members 16 and 17 connected by a pintle 18, and they also have the interlocking ears 19 and 20 which are connected by a cotter-pin 21 or other removable device, by removing which the lower end of the barrel may be swung back upon the pintle 18 so as to admit of access to the interior of the barrel. The collar 15 has an inwardly projecting flange 22, which affords a rest for the cartridge shell 23. This cartridge shell is of cylindrical open-ended form, and has a foraminous bottom which, as seen in Figs. 2 and 4, may consist of a ring 24 fitted tight in the shell and containing a piece of wire netting 25. The cartridge comprises the said shell and any suitable dense smoke-producing material, such as fuel or chemicals, capable of suffocating and killing burrowing animals. The cartridge is inserted in the barrel through its lower open end, and then when the lower end is closed and locked, the bottom of the cartridge rests upon and is supported by the flange 22 of the collar 15. Above the cartridge is an opening 26, covered by a flap 27, which affords means to introduce a match or other light to ignite the smoke-producing material of the cartridge.

The nozzle 28 has a flange 29 engaged by the flange 13 on the end of the barrel, in such way as to swivel the nozzle to the barrel and admit of said nozzle being turned in any direction most convenient to the user in operating the apparatus. Any suitable means may be used for swiveling the nozzle to the barrel's end.

In use, the loaded cartridge is inserted in the barrel and the barrel's end closed. The nozzle is then turned to the desired angle. The cartridge is ignited and then the nozzle inserted in the mouth of the burrow and the blower started. The draft keeps the combustible material of the cartridge ignited and forces the smoke and gases therefrom into the burrow.

One advantage of the invention is that the fuel and combustion device (the cartridge) may be prepared for use outside of and apart from the apparatus itself, and thus the apparatus may be easily and quickly charged, and the charge renewed. Another advantage is that by dividing and hinging the lower end of the barrel, ready access is had to the interior of the apparatus for any and all purposes, and no part need be detached excepting the cartridge. Still another advantage is that the swiveling of the nozzle permits the operator to arrange the apparatus in the most advantageous position for use with relation to the mouth of the burrow.

While the invention is entitled "squirrel exterminator", and so claimed, it is to be understood that I do not thereby limit the invention to use in killing any particular species of burrowing animals.

What I claim is:—

In a squirrel exterminator, the combination of a barrel divided transversely at its lower end, hinge members connected to and joining the parts of said barrel and provided with means for locking said parts in closed position, the hinge member on the lower part of said barrel being provided with an inwardly projecting flange, a blower mounted upon and communicating with the upper part of said barrel, a fuel cartridge adapted to be inserted in the lower end of the upper part of the barrel when said lower part is opened and supported in the barrel by said inwardly-projecting flange when said lower part is closed, and a nozzle swiveled to the hinged lower part of the barrel.

In testimony whereof I have hereunto set my hand this 18th day of February A. D. 1910.

JAMES M. BOURN.

Witnesses:
 W<small>M</small>. H<small>UNTER</small>,
 J. A. M<small>C</small>A<small>RTHUR</small>.

---

Copies of this patent may be obtained for five cents each, by addressing the "Commissioner of Patents, Washington, D. C."